United States Patent [19]
Winkler et al.

[11] Patent Number: 5,607,719
[45] Date of Patent: Mar. 4, 1997

[54] PROCESS FOR THE PREPARATION OF HEAT-RESISTANT COATINGS ON WIRES OR FIBRES AND A SUITABLE DEVICE FOR PERFORMING THE SAME

[75] Inventors: Diethard Winkler, Wuppertal; Sabine Sohnius, Düsseldorf; Guido Höveler, Monheim; Wolfgang Schülke, Breckerfeld; Rainer Krause, Wuppertal, all of Germany

[73] Assignee: Herberts GmbH, Wuppertal, Germany

[21] Appl. No.: 296,987

[22] Filed: Aug. 26, 1994

Related U.S. Application Data

[63] Continuation of Ser. No. 6,955, Jan. 21, 1993, abandoned.

[30] Foreign Application Priority Data

Jan. 20, 1992 [DE] Germany .......................... 42 01 376.3

[51] Int. Cl.$^6$ .................. B05D 5/12; B05D 1/28; B05B 5/14
[52] U.S. Cl. .................. 427/117; 427/120; 427/163.2; 427/355; 427/429
[58] Field of Search .................. 427/120, 117, 427/163.2, 355, 368, 429

[56] References Cited

U.S. PATENT DOCUMENTS

| | | | |
|---|---|---|---|
| 3,544,400 | 12/1970 | Deutsch | 427/156 |
| 4,131,693 | 12/1978 | Wendt et al. | 427/156 |
| 4,391,848 | 7/1983 | Hilker | 427/120 |
| 4,521,173 | 6/1985 | Hilker et al. | 427/117 |
| 4,704,307 | 11/1987 | Jochem et al. | 427/117 |
| 4,808,477 | 2/1989 | Harber | 427/117 |
| 4,891,086 | 1/1990 | Austin et al. | 427/117 |
| 5,066,516 | 11/1991 | Emery et al. | 427/117 |
| 5,283,290 | 2/1994 | Jung | 427/117 |
| 5,331,039 | 7/1994 | Blum et al. | 524/507 |
| 5,403,615 | 4/1995 | Winkler et al. | 427/117 |

*Primary Examiner*—Diana Dudash
*Attorney, Agent, or Firm*—Keck, Mahin & Cate

[57] ABSTRACT

A process and device for the preparation of coatings on wires or fiber-like materials by mixing one or more polymers which contain carboxyl and/or amide groups (A) and with at least two carboxyl and/or amide groups, a hydroxyl number of less than 130 and a number average molecular weight of 200 to 5000, in the liquid state, with one or more polyisocyanates (B) with at least two free isocyanate groups in the molecule and a number average molecular weight of 200 to 3000, in the liquid state, and optionally one or more other components (C) which are normally present in lacquers, in the liquid state, continuously immediately before application in a ratio such that 0.5 to 5.0 isocyanate groups are allotted to each carboxyl group or that 0.02 to 2.0 isocyanate groups are allotted to each amide group, wherein the components A, B and/or C may contain one or more catalysts, and with continuous supply of the mixture to each individual wire or fiber-like material, which is in continuous motion, in an amount which corresponds to immediate consumption.

8 Claims, 3 Drawing Sheets

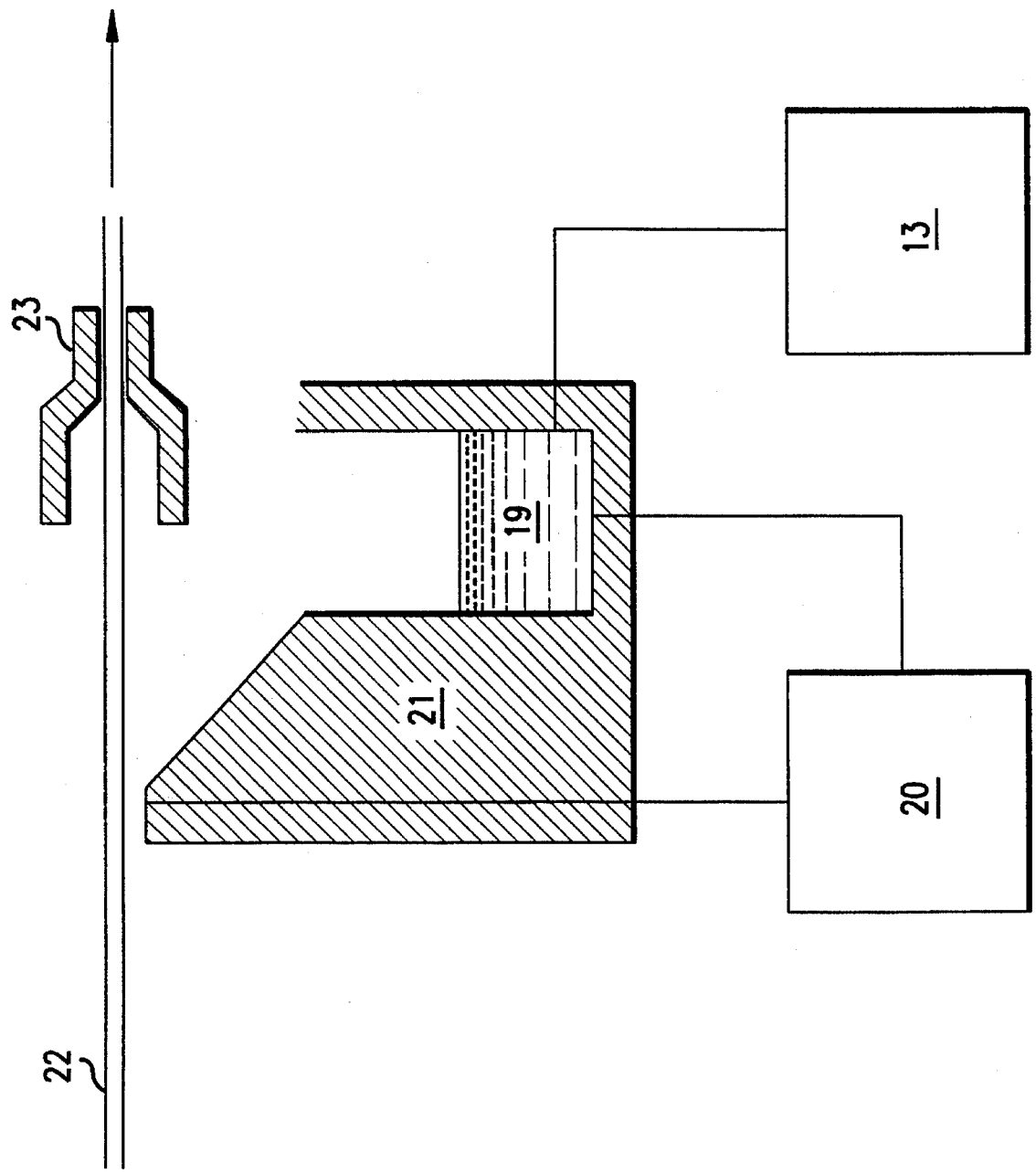

PROCESS FOR THE PREPARATION OF HEAT-RESISTANT COATINGS ON WIRES OR FIBRES AND A SUITABLE DEVICE FOR PERFORMING THE SAME

This is a continuation of application Ser. No. 08/006,955 filed on Jan. 21, 1993, the text of which is hereby incorporated by reference now abandoned.

FIELD OF THE INVENTION

The invention relates to a process for the preparation of heat-resistant, insulating coatings on electrical conductors, especially on wires, but also, however, on fiber-like materials. For this purpose, compounds which contain carboxyl groups are continuously mixed with polyisocyanates in an amount corresponding to consumption, immediately before processing, and supplied to the wire. Cross-linking is effected by supplying heat.

BACKGROUND OF THE INVENTION

The preparation of polymer coatings by reacting diisocyanates and compounds with two or more reactive hydrogen atoms is generally known from DE-A 756 058. Example 10 describes the lacquering of a copper wire with a mixture of diisocyanates and a polyester which contains hydroxyl groups.

In practice, lacquers and processes, for example to produce polyurethane wire enamels, have proved to be unsuitable because it was not possible to obtain specific thicknesses of enamel coating. Capped polyisocyanates, which ought not to possess this disadvantage, were developed for this reason. (O. Bayer: Neuere Entwicklungen des Diisocyanat-Polyaddition-Verfahrens/FATIPEC 1957, p. 14 and 15 as well as Houben-Weyl, 1962, vol.14/2, p.78 and BAYER-Produkte für die Elektroisolierung, items 1.1/2 to 1.1/3, Status 1987).

Wire lacquers made from condensation resins which contain hydroxyl groups and phenol-capped polyisocyanates are now used on a large scale for the preparation of enamelled wires which can be readily tinned. As a rule, lacquers dissolved in cresol possess solids contents of only about 25–35%. The coatings obtained using these do not possess adequate thermal properties for many applications due to the desired instability of the urethane groups.

The use of polyesterimides, polyesteramidimides, polyimides and polyamidimides as very heat-resistant electrical insulation materials for electrical conductors such as e.g. winding wires made of copper or aluminium is known. ("Moderne Electroisolierlacke—ein Fortschritt bei hochtemperaturebeständigen Kunststoffen" Kunststoffe, 61, 1971, pages 46–56, published by Carl Hanser, Munich).

Polyesterimides and polyesteramidimides are prepared e.g. by condensation of an excess of polyalcohols such as ethylene glycol, tris(hydroxyethyl)isocyanurate with dimethylterephthalate, trimellitic anhydride and diaminodiphenylmethane (DE-A 16 45 435). Cresols in combination with aromatic hydrocarbons are generally used as solvents. Cross-linking takes place with the elimination of glycols and requires a high energy input. In the case of relatively thick layers of lacquer, small bubbles or blisters may be produced by the eliminated glycols.

Higher aromatic/aliphatic polyamides are described for use as fired lacquers with particularly good thermal and chemical stability. They are dissolved in N-methylpyrrolidone and in combination with aromatic hydrocarbons and have solids contents of about 25–30% by weight at a processing viscosity of about 1000–2500 mPa.s. If it is attempted to condense these compounds to a lesser degree in order to increase the solids content then the solutions are not stable to storage. and the lacquer film properties are very poor (U.S. Pat. No. 4,501,883).

Polyimides have extraordinarily high thermal stability. They are obtained, for instance, by reacting tetracarboxylic anhydrides (pyromellitic dianhydride, benzophenonetetracarboxylic dianhydride) and diamines (diaminodiphenylmethane, diaminodiphenylether) in strongly polar solvents (N-methylpyrrolidone, dimethylacetamide, cresol), wherein polyamido acids are produced as soluble intermediates. These are converted. into polyimides under heat treatment with the elimination of water. The solutions have low solids contents; their storability is limited because cyclisation to the imide takes place slowly even at room temperature and the water being produced leads to progressive hydrolysis of the amide bonds (see also DE-A 15 95 005 and DE-A 23 46 393).

Polyamidimides are used to insulate electrical conductors both as a base-coat and as an over-coat with good thermal, mechanical and chemical resistance. Usually, they are prepared by reacting tricarboxylic anhydrides with diisocyanates (DE-A 25 42 706, DE-A 32 49 544). In this instance it is necessary to react up to relatively high molecular weights in order to obtain the required characteristics accompanied by good storage stability for the lacquer. The lacquers prepared in this way are dissolved in N-methylpyrrolidone or cresol and have solids contents of ca. 15–35% (see also DE-A 12 56 418).

For preparation of polyamidimide lacquers with a higher solids content, DE 35 44 548 suggests mixing lower polyamidimide precursors which contain carboxyl groups with fully capped polyisocyanates. However, when using phenol-capped polyisocyanates, the storage stability of the lacquers is still inadequate. The viscosity increases greatly over a short period which impairs the ability to form a coating.

The use of alcohol-capped polyisocyanates improves the storage stability, but impairs the curing rate to an undesirable extent.

The preparation of lacquered wires usually takes place by multiple continuous applications of the wire lacquer to the copper wire using felt or nozzle wiping techniques. After each application, the lacquer is hardened at temperatures between ca. 300° and 700° C. The solvent and capping agent are eliminated during the cross-linking process and escape from the lacquer film. They are generally catalytically incinerated and emitted to the environment in the form of $CO_2$. To eliminate the capping agent, additional energy has to be supplied during the hardening process.

When using capped polyisocyanates, several reactions take place at the same time during heat-curing. On the one hand, the solvents evaporate, while at the same time a relatively large decrease in the viscosity of the binder occurs on raising the temperature. In parallel with this, cross-linking takes place with elimination of the capping agent. The process is extraordinarily complex and it is difficult to achieve higher rates of processing at increased solids contents without impairing the surface of the lacquer.

The elevated temperature of between ca. 300° and 700° C. required to form the film may even lead to pyrolytic degradation reactions during the hardening process.

SUMMARY OF THE INVENTION

The object of the invention is to make available a process for the preparation of heat-resistant, electrical insulating coatings or for the lacquering of wires and fibrous materials, which leads to uniform lacquer coatings, does not release any harmful cleavage products and reduces the emissions of solvents. The process should lead in particular to insulated copper wires with high heat-resistance.

It has been shown that this object may be achieved by a multi-component technique which has not hitherto been disclosed for lacquering wires or fibrous materials.

The invention therefore relates to a process for the preparation of heat-resistant coatings on wires or fibrous materials by coating or lacquering with liquid mixtures of polymers which contain carboxyl and/or amide groups and polyisocyanates and subsequent hardening, characterised in that A) one or more polymers which contain carboxyl and/or amide groups, with at least two carboxyl and/or amide groups in the molecule, an OH number of less than 130, preferably less than 50 and a number average molecular weight of 200 to 5000, preferably 500 to 3000 in the liquid state is mixed with B) one or more polyisocyanates with at least two free isocyanate groups and a number average molecular weight of 200 to 3000, preferably 250 to 1500 in the liquid state and optionally C) one or more other normal lacquer components in the liquid state, continuously and immediately before application to the wire in a ratio such that 0.5 to 5.0, preferably 0.8 to 2.0 isocyanate groups are allotted to each carboxyl group, and that 0.02 to 2.0, preferably 0.1 to 1.0 isocyanate groups are allotted to each amide group, wherein the components A, B or C may contain catalysts and/or the usual additives and that this mixture is supplied to the wire, which is in continuous motion, in an amount corresponding to consumption.

The process is not restricted to only one component each for A, B or C. Several components of the types A, B or C may also be metered in at the same time. The scope of application of the process is widened in this way. Insulating, heat-resistant coatings with different properties may be prepared simply by adjusting the materials.

In the process according to the invention the individual components A, B and C are preferably mixed immediately before application in those amounts which correspond to the amount of mixed coating to be applied before expiry of the hardening time.

Depending on the starting compounds selected, polyamides, polyimides, polyamidimides, polyesteramides or polyesteramidimides may be produced on cross-linking via carboxyl groups of the coating agent in the process according to the invention. These may optionally be modified by further heterocyclic groups. Surprisingly it has been found that also cross-linking via amide groups of component A furnishes electrically isolating, thermically very stable coatings. The amide groups have the general formula

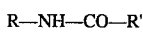

wherein R and R' are aliphatic, cycloaliphatic, heterocyclic, aromatic-aliphatic groups. Aromatic groups furnish especially stable coatings. If components A are used which are free from carboxyl groups, it is necessary to use at least two, preferably three or more amide groups per molecule. The presence of amide as well as of carboxyl groups is very convenient; in this case the sum of carboxyl and amide groups per molecule is at least 2.

Component A is one or more polymers which contain carboxyl and/or amide groups as stated previously. For instance, the monomers, oligomers and/or polymers which contain carboxyl groups and which are quoted in the following may be present as such. However, the latter could also be converted, for example with polyols, polyamines, aminoalcohols, aminocarboxylic acids and/or lactams to give other usable polycarboxylic acids based on esters or amides and/or imides, etc.

As component A and/or to prepare component A, monomers, oligomers and/or polymers which contain carboxyl groups, of the general formula

are used, for example, wherein n is at least 2 and R represents an aliphatic, cycloaliphatic, aromatic or araliphatic radical, which may be modified by ester, ether or preferably amide groups and, in a preferred embodiment, may also contain five or six-membered heterocyclic rings which contain nitrogen. Some of the carboxyl groups may also be replaced by cyclic anhydride groups, wherein the sum of anhydride, carboxyl and/or amide groups must be at least 2. Each component A may also consist of mixtures of different compounds which contain carboxyl and/or amide groups.

Commercially available aromatic, aliphatic or heterocyclic polycarboxylic acids with molecular weights of 200 to 500, for example, are also suitable as component(s) A. However, reaction products from polycarboxylic acids and/or cyclic polycarboxylic anhydrides, which still possess at least one other anhydride or carboxyl group in addition to the anhydride grouping, and a deficiency of polyalcohols, polyamines, aminoalcohols, aminocarboxylic acids, lactams or polyisocyanates, are preferred.

Polycarboxylic acids which are suitable for preparing component(s) A are aliphatic, cycloaliphatic, heterocyclic, aromatic or aromatic/aliphatic polycarboxylic acids, for example of the general formulas

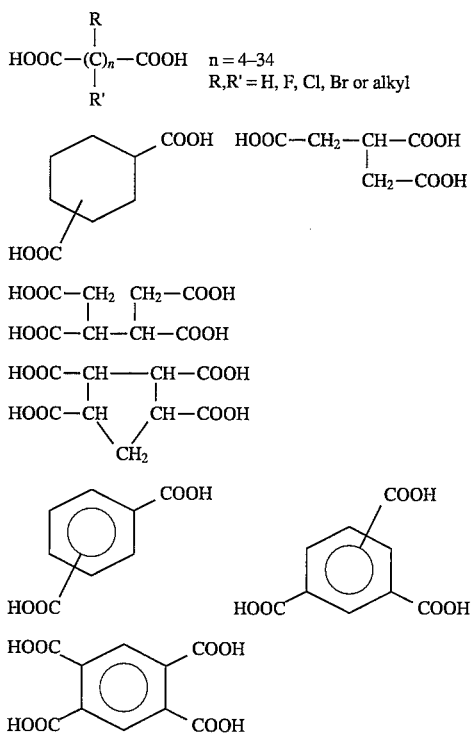

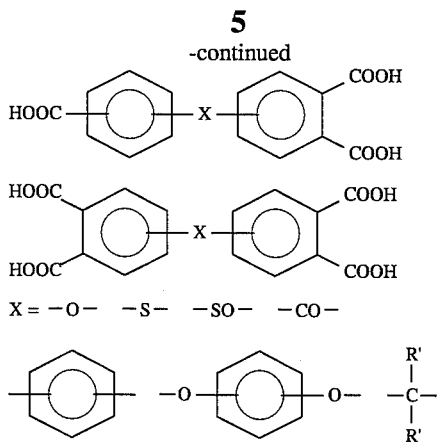

X = —O— —S— —SO— —CO—

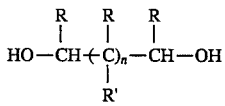

in which R and R' are defined as above.

The corresponding anhydrides or even at least sometimes the corresponding esters may also be used instead of the polycarboxylic acids. Compounds which may be considered are, for example, adipic acid, azelaic acid, sebacic acid, decanedioic acid, butanetetraoic acid (anhydride), pentanetetraoic acid (anhydride), isophthalic acid, terephthalic acid, trimellitic acid (anhydride), trimesinic acid, tris-(2-carboxyethyl)-isocyanurate, pyromellitic acid (anhydride), benzophenonetri- and tetraoic acid (anhydride).

Polyols which are suitable for preparing component A are, for example, those with at least two aliphatically bonded hydroxyl groups, for example of the general formula

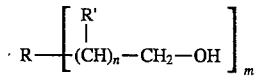

in which n is an integer between 0 and 20, R represents hydrogen or a $C_{1-4}$ alkyl and R' represents hydrogen, —OH, —CH$_2$OH, —NH$_2$ or a $C_{1-4}$ alkyl.

Further examples are polyalcohols of the general formula

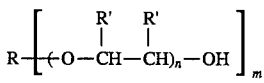

in which n=0 to 2, m=2 to 4, R may be a polyfunctional aryl, alkyl, cycloalkyl or heterocyclic radical and R' may be hydrogen or a $C_{1-4}$ alkyl.

Further examples are polyols which contain ether groups of the general formula $$R\text{---}\left[\text{(-O---CH---CH)}_n\text{---OH}\right]_m \begin{array}{c} R' \ R' \end{array}$$

in which n=1 to 10, m=2 to 4, R may be a polyfunctional aryl, alkyl, cycloalkyl or heterocyclic radical and R' may be hydrogen or a $C_{1-4}$ alkyl.

Suitable polyols are e.g. ethylene glycol, diethylene glycol, triethylene glycol and higher homologues, propanediol-1,2 and -1,3, butanediol-1,4 and -2,3, pentanediol-1,5, hexanediol-1,6, neopentylglycol, 1,4-bishydroxymethyl-cyclohexane, glycerine, trimethylolethane, trimethylolpropane, tris-(hydroxyethyl)-isocyanurate.

In general lower molecular polyols with 2 to 4 primary hydroxyl groups such as ethylene glycol, trimethylolpropane and tris-(hydroxyethyl)-isocyanurate are preferred. Mixtures of different polyols may also be used. Thus, for instance, fractional amounts of long chain aliphatic diols or ether-polyols with more than 10 carbon atoms may be used to add elasticity and to improve adherence.

Instead of the polyols, lower molecular compounds may also be used completely or partly, these containing epoxide rings and reacting with the polycarboxylic acids to give esters. For example, those of the general formula

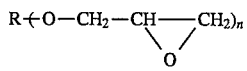

wherein n is an integer between 2 and 4 and R represents an aliphatic, cycloaliphatic, heterocyclic or aromatic radical. Examples are the known reaction products of bisphenol A, bisphenol F or novolaks with epichlorhydrin.

To prepare component A, suitable polyamines for reacting with the polycarboxylic acid component are aliphatic, cycloaliphatic, heterocyclic, aromatic or aromatic/aliphatic polyamines with at least two amino groups in the molecule, for example those of the general formulas

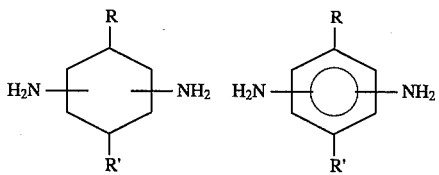

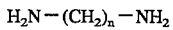

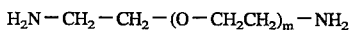

wherein R and R' represent hydrogen or a $C_{1-8}$ alkyl, n is an integer between 2 and 20 and m is an integer between 1 and 10.

Aromatic polynuclear polyamines are preferred, for example those of the general formula

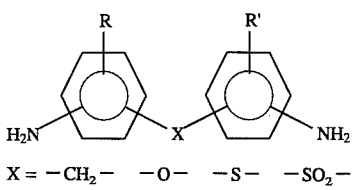

X = —CH$_2$— —O— —S— —SO$_2$—

R and R' are independently H or a $C_{1-8}$ alkyl.

Suitable aminoalcohols for preparing component A are e.g. those with aliphatically bonded hydroxyl groups of the general formula

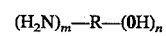

wherein R represents an aliphatic, cycloaliphatic or aliphatic/aromatic radical with 2–20 carbon atoms and m=1 to 3 and n=1 to 3. Examples are ethanolamine, aminopropanol, aminobutanol and aminobenzyl alcohol.

Aminocarboxylic acids which are suitable for preparing component A are for example those of the general formula

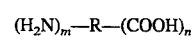

wherein R represents an aliphatic, cycloaliphatic, aromatic, aromatic/aliphatic or heterocyclic radical with 2–20 carbon atoms and m and n are integers from 1 to 3. Examples are aminobenzoic acid, aminoisophthalic acid and aminocaproic acid.

Lactams which are suitable for preparing component A are e.g. those of the general formula

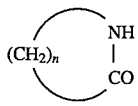

wherein n is an integer between 2 and 20, for example caprolactam.

Polyisocyanates according to the invention which are suitable for preparing component A are for example, aliphatic, cycloaliphatic, aromatic, aromatic/aliphatic or heterocyclic polyisocyanates with 6 to 30 carbon atoms and at least 2 isocyanate groups in the molecule.

Particular examples of polyisocyanates are:

4,4'-diisocyanato-diphenylmethane [MDI]

4,4'-diisocyanato-diphenylether 4,4'-diisocyanato-diphenyl-dimethylmethane 2,4- and 2,6-toluylene diisocyanate [TDI]

1,3- and 1,4-phenylene diisocyanate naphthylene diisocyanate , 1,6-hexamethylene diisocyanate 3-isocyanatomethyl-3,5,5-trimethyl-cyclohexyl isocyanate [IPDI]

2,2,4- and 2,4,4-trimethyl-hexamethylene diisocyanate cyclohexanone-1,3 and -1,4 diisocyanate 1,12-dodecane diisocyanate.

Aromatic diisocyanates such as

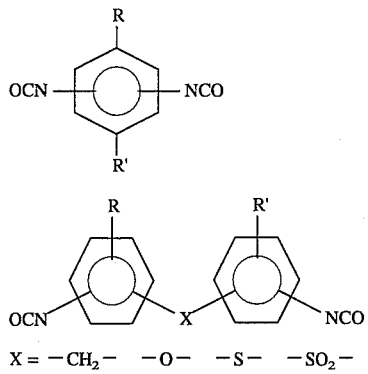

or their dimerised and trimerised forms are preferred, wherein R and R' represent hydrogen or a $C_{1-8}$ alkyl.

In a preferred embodiment with particularly good heat-resistance, the components A which contain carboxyl groups contain at least some heterocyclic nitrogen-containing five- or six-membered rings in the molecule. Suitable heterocyclic rings are e.g. isocyanurate rings (I) as well as five-membered imide rings (II), hydantoin rings (III) and/or lactam rings (IV).

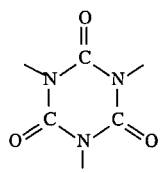

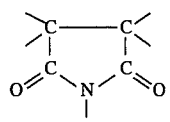

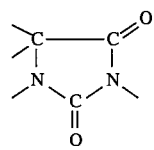

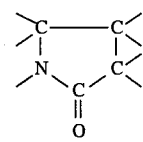

Isocyanurate rings (I) may be introduced e.g. via tris-(2-hydroxyethyl) isocyanurate or tris-(2-carboxyethyl) isocyanurate or trimerised polyisocyanates.

Compounds containing hydantoin rings (III) are described in, for example, DE-A 1 814 497 and DE-A 2 436 109.

Polycarboxylic acids with five-membered lactam rings (IV) may be obtained by reacting itaconic acid with amino-substituted compounds such as 4,4 '-diaminodiphenylmethane, p-aminobenzoic acid or 5-aminoisophthalic acid.

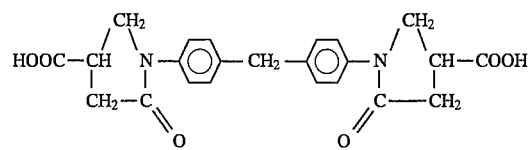

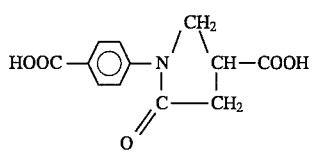

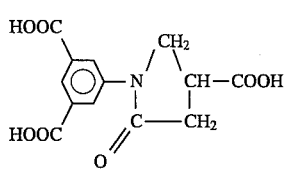

Imide rings (II) are preferred because they are readily available. Compounds which contain imide rings be prepared by known methods, for instance from cyclic carboxylic anhydrides which contain at least one further anhydride or carboxyl group as well as the cyclic anhydride group, by reaction with aminocarboxylic acids, polyamines, polyisocyanates, aminoalcohols or lactams (DE-A 1 795 595, DE-A 1 795 596, DE-A 2 659 092).

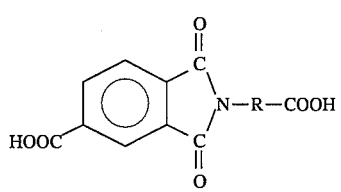

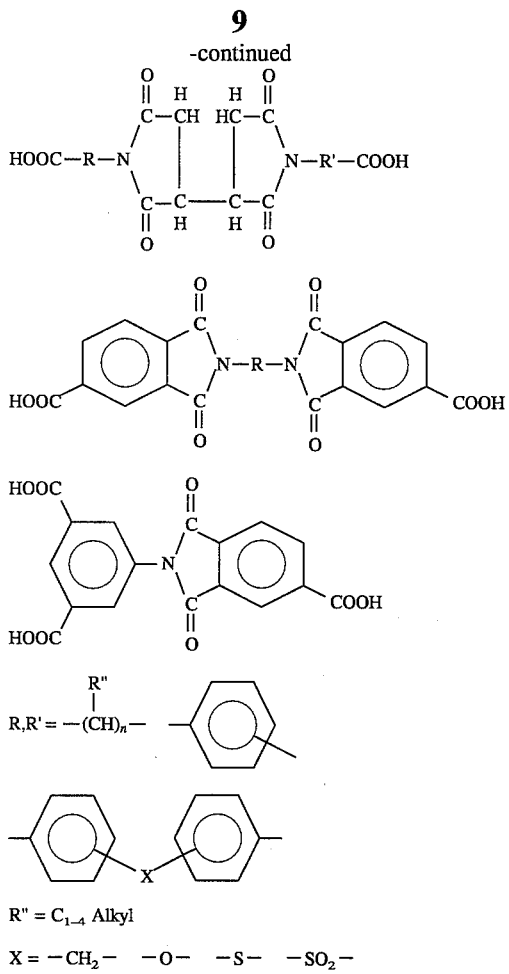

wherein n is an integer between 2 and 20.

Particularly preferred is the reaction product from trimellitic acid(anhydride) and diaminodiphenylmethane or diaminodiphenyl ether or the corresponding diisocyanate.

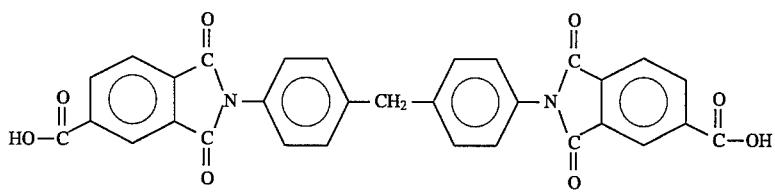

The preparation of these compounds which contain imide rings may be performed in well-known processes, e.g. by reacting trimellitic acid(anhydride) with diaminodiphenylmethane in a molar ratio of 2:1 to 3:1, e.g. at 100°–200° C. in strongly polar solvents such as cresol or N-methylpyrrolidone, with the elimination of water. The imide-containing dicarboxylic acid may then be isolated. Preferably, however, it is formed in situ during the preparation of component(s) A.

Preparation of component A in the form of oligomeric or polymeric compounds which contain carboxyl groups and which contain ester and/or amide groupings may take place by known polycondensation methods by reacting polycarboxylic acids and/or their anhydrides with a deficiency of polyols, polyamines, and/or aminoalcohols, e.g. at temperatures of 100° to 280° C., preferably 160° to 250° C. with the elimination of water. The reaction may be performed in the fused state or in inert solvents. Progress of the reaction may readily be followed, e.g. by determining the acid number, hydroxyl number and viscosity. Preferably, reaction is continued up to almost complete conversion.

However, the reaction may also be performed initially with less of the polycarboxylic acid than is required and then the remaining hydroxyl groups are reacted with preferably equivalent amounts of polycarboxylic acids or of anhydride compounds which have at least one further anhydride or carboxyl group in addition to the anhydride group.

Polyfunctional compounds which contain imide groups and which are capable of forming esters and/or amides may be formed beforehand, or preferably may also be prepared during the condensation process in situ, e.g. by reacting tri- or tetracarboxylic anhydrides with polyamines, aminoalcohols, aminocarboxylic acids or lactams. Thus, for instance, on simultaneous addition of trimellitic anhydride and diaminodiphenylmethane in a molar ratio of 2:1 at temperatures between for example 100° and 200° C., the corresponding imide-containing dicarboxylic acid is formed with the rapid elimination of water. The IR spectrum shows, in addition to the carbonyl peaks at 1710–1720 cm$^{-1}$, the peaks which are typical of cyclic imides at 1780 cm$^{-1}$ and 1380 cm$^{-1}$.

In specific cases it may be expedient to use supplementary fractional amounts of monofunctional carboxylic acids, anhydrides, alcohols and/or amines, for example to restrict the molecular weight or to improve the surface quality. Examples are benzoic acid, salicylic acid, maleic anhydride, tetrahydrophthalic anhydride, benzyl alcohol, methyl diglycole and aliphatic monocarboxylic acids, alcohols and/or amines with 8–36 carbon atoms.

The ratios of amounts of the initial raw materials are selected in such a way that at almost complete reaction of the carboxyl groups with the hydroxyl and/or amine groups, the mean number average molecular weight of component(s) A is 200 to 5000, preferably 500 to 3000 and there are at least 2 free carboxyl and/or amide groups per mole of component(s) A.

Since small residual amounts of water may remain in the oligomers or polymers on polycondensation, these are expediently removed in an azeotropic process when reaction has finished. The entraining agents usually used are aromatic hydrocarbons such as toluene or xylene.

Another possibility for preparing oligomeric or polymeric compounds of component(s) A is the reaction of polycarboxylic acids and/or their anhydrides with a deficiency of polyisocyanates by known methods (e.g. DE-A 35 44 548). Amide- and/or imide-containing compounds are produced in this way.

The reaction of polycarboxylic acids and/or anhydrides with polyisocyanates takes place e.g. at about 80° to 200° C., with the elimination of $CO_2$, in anhydrous solvents which are inert towards the isocyanate group, such as N-methylpyrrolidone, dimethylformamide or dimethylacetamide. Progress of the reaction may be followed via the amount of $CO_2$ eliminated or by the decrease in acid number and the isocyanate peaks at about 2260 cm$^{-1}$ in the IR spectrum.

It may also be expedient here to make joint use of fractional amounts of monofunctional carboxylic acids, alcohols or isocyanates. Examples are benzoic acid, salicyclic acid, benzyl alcohol, aliphatic monocarboxylic acids, monoalcohols or monoisocyanates with e.g. 6 to 36 carbon atoms as well as cyclic mono-anhydrides which do not possess any other carboxyl or anhydride groups, such as e.g. maleic anhydride, phthalic anhydride or tetrahydrophthalic anhydride.

Instead of the polycarboxylic acids, some compounds with glycine ester groups of the general formula

(HOOC)$_n$—R—(NH—CH$_2$—COOR')

where n=0 to 2, m=1 to 3, n+m≧2, may be used to react with polyisocyanates, wherein R preferably represents an aromatic radical with 6–18 carbon atoms and R' represents an alkyl radical with 1–4 carbon atoms. Compounds of this type are described e.g. in DE-A 18 14 497. Polyhydantoin structures are produced on reaction with polyisocyanates.

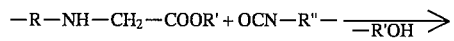
—R—NH—CH$_2$—COOR' + OCN—R"— $\xrightarrow[-\text{R'OH}]{}$

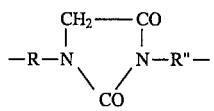

The ratios of amounts of polycarboxylic acids and polyisocyanates are selected in such a way that on almost complete reaction of the isocyanate groups the mean number average molecular weight is between 200 and 5000, preferably between 500 and 3000 and at least 2 free carboxyl and/or amide groups are present per mole of component(s) A.

Suitable isocyanate component(s) B with at least two free isocyanate groups are aliphatic, cycloaliphatic, araliphatic, aromatic and heterocyclic polyisocyanates with molecular weights between 200 and 3000, preferably 250–1500, for example:

4,4'-diisocyanatodiphenylmethane 2,4'-diisocyanatodiphenylmethane 4,4'-diisocyanatodiphenyl ether 1-isocyanato-3,3,5-trimethyl-5-isocyanatomethyl-cyclohexane 2,2,4- and 2,4,4-trimethylhexamethylene diisocyanate.

Furthermore, polyisocyanates which may be considered are those described e.g. in Houben-Weyl vol. 14/2, p. 64–70:

reaction products of polyisocyanates with a deficiency of polyalcohols trimerisation products of isocyanates carbodiimide-containing polyisocyanates reaction products with a biuret structure uretdione-containing polyisocyanates polyisocyanates with amide or imide structures, which are obtained e.g. by reacting polycarboxylic acids and/or polycarboxylic anhydrides with an excess of polyisocyanate.

Mixtures of different polyisocyanates may also be used to produce specific properties.

The usual lacquer additives may be added to components A and/or B in the usual way. In order to develop the application process in a variable way, however, they may also be metered in as separate components C immediately before application. Examples are anhydrous liquid compounds, solutions or dispersions of flow-control agents, lubricants, dyes, combination resins and catalysts.

Lubricants as component C

The multi-component technique according to the invention is also suitable for the incorporation of so-called "internal" lubricants into the lacquer.

Lubricants are supposed to improve the processability of winding wires provided with an insulating coating (see DE-A 2 37 022, EP-A 00 72 178, EP-A 01 03 307, EP-A 02 67 736). During the usual application of so-called "external" lubricants to the insulated winding wire, for example in the form of 0.5 to 2% strength solutions of paraffins or waxes in very volatile organic solvents, the solvents evaporate and are emitted to the environment or incinerated. The solvents which are used may cause surface cracks in the lacquer.

This and other disadvantages do not apply in the case of the well-known use of so-called "internal" lubricants, which are admixed directly into the lacquer. Examples are polyethylene, polypropylene, polytetrafluoroethylene, silicone oils, paraffins and oligomeric or polymeric esters or amides based on long-chain aliphatic fatty acids, fatty alcohols, polyethylene glycols, polypropylene glycols or fatty amines. The lubricants generally migrate to the surface of the film during hardening of the lacquer film due to their at least partial incompatibility and there form a layer with improved lubricating properties. However, many of these additives are also incompatible with the liquid lacquer and lead to storage instability due to agglomeration or separating.

Using the multi-component technique according to the invention, lubricant additives of this type, provided they produce stable mixtures, may be included in components A and/or B. However, if they are incompatible or if undesirable reactions occur, it is better to mix these additives with components A and B as a separate component C, in the form of non-aqueous solutions, emulsions or dispersions, immediately before processing.

In connection with a multi-layered structure, it may be advantageous to provide only the outermost application of lacquer with the internal lubricant. This restricts any disadvantages with reference to thermal, chemical or mechanical properties to the outermost layer of lacquer.

In order to coat different sizes of wire, as a rule lacquer mixtures with different solids contents and viscosities are required. Adjustments which are required may be performed in a simple way by adding the appropriate amounts of solvent as component C immediately before processing.

Due to the special method of application, the residence time of the lacquer mixture after homogenisation is fairly short. The narrow transport pipes cause high rates of flow and turbulence. Therefore extenders, that is solvents, may be used which are completely or partially incompatible with the individual components and which would lead to separating if stored for any length of time.

For example, aromatic hydrocarbons such as xylene, Solvesso 100® or Solvesso 150® are mostly non-solvents, but in limited amounts are cost-effective extenders. As a rule they bring about a sharp reduction in viscosity, at the per se desired relatively high concentrations in the lacquer, however, they lead to storage instability and separating. Extenders of this kind may advantageously be admixed in comparatively high concentration as component(s) C in the process according to the invention.

The components in the multi-component coating agents used according to the invention may be present in a form which either contains solvents or contains no solvents. If solvents are used, then they must not contain any isocyanate-reactive groups when used in component B. Solvents are used mainly to improve the flow behaviour and have boiling points of, for example, about 100° to 250° C., preferably 140°–210° C. The concentration is kept as low as possible and may be further reduced by warming the components to temperatures of up to about 50° C. As a rule, a maximum of 10 to 60% by weight of solvent is sufficient.

Suitable solvents and flow-control agents are e.g.:

N-methylpyrrolidone, dimethylformamide, dimethylacetamide, butyrolactone glycol esters such as methoxypropyl acetate, ethoxypropyl acetate, butyl glycol acetate, propylene glycol diacetate glycol ethers such as dimethyldiglycol ether, methylglycol-tert.butyl ether, ethylglycol-tert.butyl ether, butylglycol-tert.butyl ether, methyldiglycol-tert.butyl ether aromatic hydrocarbons such as toluene, xylene, Solvesso 100®, Solvesso 150® ketones such as cyclohexanone, methylisobutyl ketone, methylisoamyl ketone.

As reactive thinners, the isocyanate-free components A or C or liquid, hydroxyl-, amino- or carboxyl-containing compounds may be used. Examples are ethylene glycol, propylene glycol, diethanolamine, triethanolamine, higher molecular polyethylene glycols and propylene glycols. Furthermore, components A and C may also contain those solvents which may react reversibly with component B, such as e.g. acetylacetone or ethyl acetate. Addition of solvents of this type may optionally serve to control the rate of reaction.

In the process according to the invention the components A, B and optionally C are mixed continuously immediately before processing in a ratio which allots 0.5–5,0. preferably 0.8 to 2.0 isocyanate groups to each carboxyl group and 0.02 to 2.0, preferably 0.1 to 1.0 isocyanate groups to each amide group. The optimal cross-linking ratio is expediently determined by practical trials. The properties of the insulating coating may be varied by altering the cross-linking ratio.

The coating or lacquer mixture may also contain additional catalysts, flow-promoting agents, stabilisers to control the gel time and combination resins such as phenol resins, melamine resins, epoxide resins. Additives of this type are preferably admixed with component A or C.

The rate of cross-linking may be increased by the addition of known catalysts for isocyanate reactions. This enables further reduction of the furnace temperature or an increase in the rate of covering.

Suitable catalysts are e.g. organometallic compounds of lead, tin and zinc, such as tetraphenyl lead, tetraethyl lead, hexaphenyl ditin, hexa-n-butyl ditin and zinc octoate, titanium compounds such as tetrabutyl titanate, titanium acetylacetone, diethanolamine titanate or triethanolamine titanate.

The catalysts are used for instance in an amount between 0.1 and 5.0% preferably 0.3 to 1.0% by weight, relative to the total amount of components A and B. They are preferably added to component A or C. Higher added amounts generally produce no advantages.

In the process according to the invention, the components are mixed continuously and immediately before application to the electrical conductor. Each individual conductor, e.g. a wire, is therefore supplied in a unit of time with only the amount of lacquer which is also consumed. It is preferred to work in such a way that mixing of the individual components A, B and optionally C as well as optionally other lacquer components, takes place immediately prior to application and only in those amounts which are appropriate to the amounts being applied.

BRIEF DESCRIPTION OF THE DRAWINGS

FIG. 4 is a schematic view of a device of the invention.

DETAILED DESCRIPTION OF THE PREFERRED EMBODIMENTS

Figure 1:
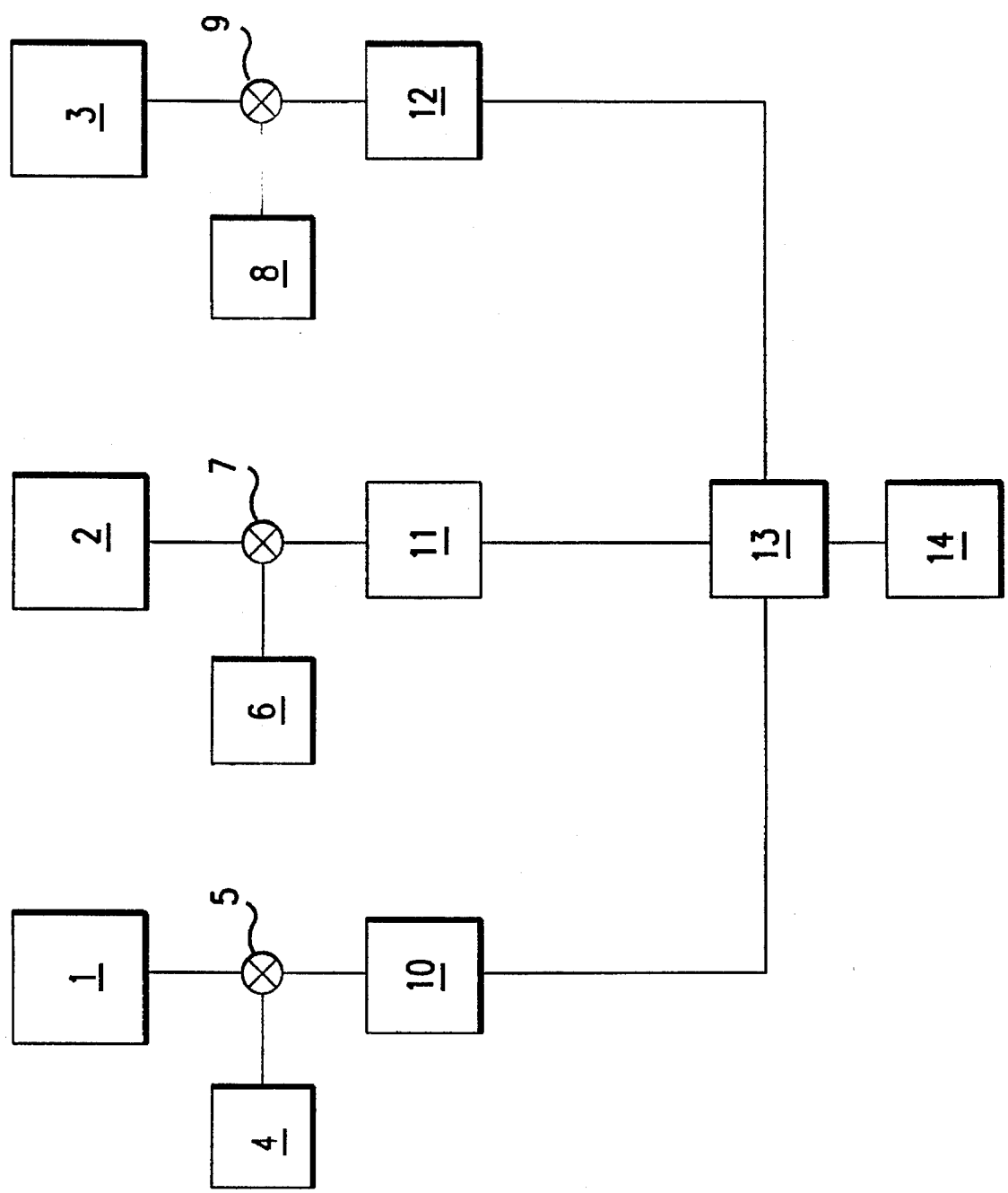
FIG. 1 is a schematic view of a multi-component processing unit.

To prepare the mixture, the usual multi-component processing units, such as are shown schematically in FIG. 1, for example, are suitable.

In the example represented in FIG. 1, 1 is the storage container for component A, 2 is the storage container for component B and 3 is the storage container for component C. 4, 6 and 8 are storage containers for rinsing diluents for components A, B and C. 5, 7 and 9 are taps, for example 3-way taps. 10, 11 and 12 are separate controllable pumps, for example gear pumps. 13 represents a mixing device and 14 a lacquer distributor, with application device.

Using such a device, components A, B and C and optionally other lacquer additives may be mixed continuously in definite proportions immediately before application to the wire. The lacquer mixture is taken separately to each application device and in an amount corresponding to consumption. The transport route from the mixing device to the application device is kept short.

Commercially available two- and multi-component processing units are suitable to prepare the lacquer mixture, e.g. Eldo-Mix from Hilger and Kern. The components are each fed separately from their storage containers to the mixing device and are intimately mixed there.

The pumps could act continuously (gear pumps) or intermittently (piston pumps). The amount supplied by each pump per unit of time is variable and adjustable via the speed of the motor and the gearing. Thus, the mixing ratio and the amount of lacquer supplied to the application device per unit of time can be set precisely. Adjustment is carried out in such a way that the amount supplied corresponds to the consumption of lacquer by the application devices.

The mixing ratio of the lacquer components can be varied and optionally adapted to different requirements by changing the pump motor speeds. Exchanging the storage containers for components A, B or C enables rapid conversion of the lacquer mixture to a new quality variant.

The supply of components A, B and C may be blocked on demand before the pumps, by means of taps, and changed over to the discharge of rinsing diluent from the separate containers. This is required, e.g. when interrupting or terminating the lacquering process. Rinsing diluents which are suitable are e.g. inert solvents which are compatible with components A, B and C, such as e.g. those described previously. They may also contain monofunctional alcohols, such as methyl diglycol.

Mixing the components in the mixing device may be achieved mechanically or statically. For example, commercial static mixing tubes which bring about trouble-free homogenisation by stream-splitting and radial mixing have proven to be satisfactory.

The mixing device is connected to a lacquer distributor. The homogenised lacquer is divided up here for conveyance to the individual application devices. The path between the mixing device and the application device is kept short.

The lacquer distributor may consist, for instance, of a short tubular section into which are inserted flexible capillary tubes, e.g. made from high-grade steel. The use of capillary tubes enables a flexible and directed supply of lacquer to the application devices. Such a lacquer distributor is described for example in DE-A 40 23 061.

In this context capillaries, capillary tubes or capillary-like bored holes denote tubes or tubular materials, especially metal tubes, with an internal diameter of 0.1 to 2.0 mm. The internal diameter here is determined mainly by the rate of discharge (about 0.2 to 10 ml/min) and the viscosity of the lacquer. The length of the tubes is determined by the local machine conditions; it is for example 1–100 cm. Devices which are similar to capillaries may also be constructed using drilled metal or plastic structures. The effect of such arrangements is that they achieve relatively high rates of flow (1–100 cm/sec) with small amounts of liquid. This ensures that the mixed components do not react in the transport system and thus that blockages may be avoided. The number of capillaries or bored holes is determined by the number of wires (wire feeding holes) to be coated.

An example of a suitable device operates, for instance, with the following characteristics for the capillaries or capillary-like bored holes:

internal diameter 0.05 cm length 40 cm number 7 rate of discharge 0.2–5 ml/min rate of flow 1.7–42 cm/sec.

The length of the capillaries may be variable and may be adjusted to the requirements. Under the term "lacquer distributor and capillaries" is also to be understood, for instance, a tubular structure which is provided with narrow, capillary-like bored holes and which is mounted directly above the application device or application devices.

Additional mechanically or electromagnetically controllable cut-off valves may be located between the lacquer distributor and the application device in order to adapt the flow of lacquer precisely to the consumption of each individual application device. Furthermore, the viscosity of highly viscous lacquer mixtures may be lowered by using a heating device for the capillary tubes. The small diameter of the piping enables good heat transfer.

Figure 2:
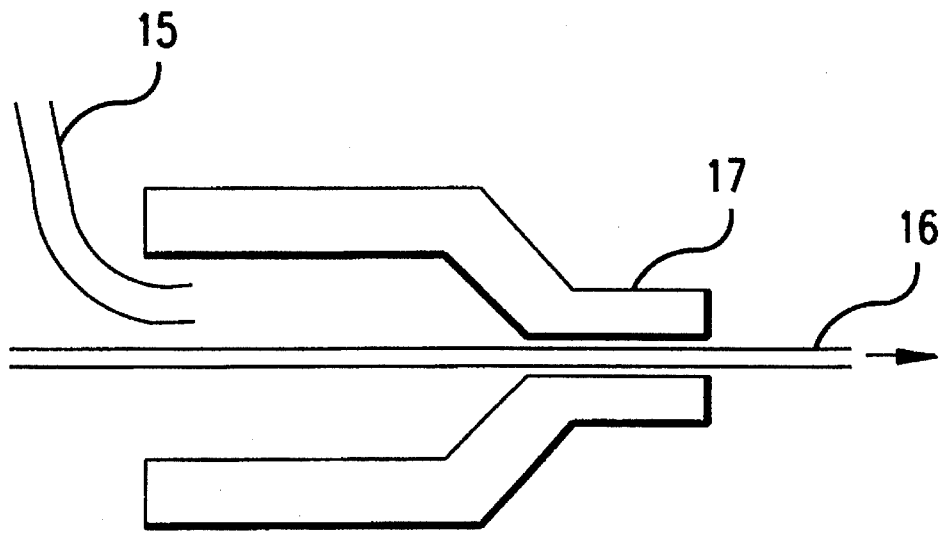
FIG. 2 is a schematic view of an application device for a coating agent.
Figure 3:
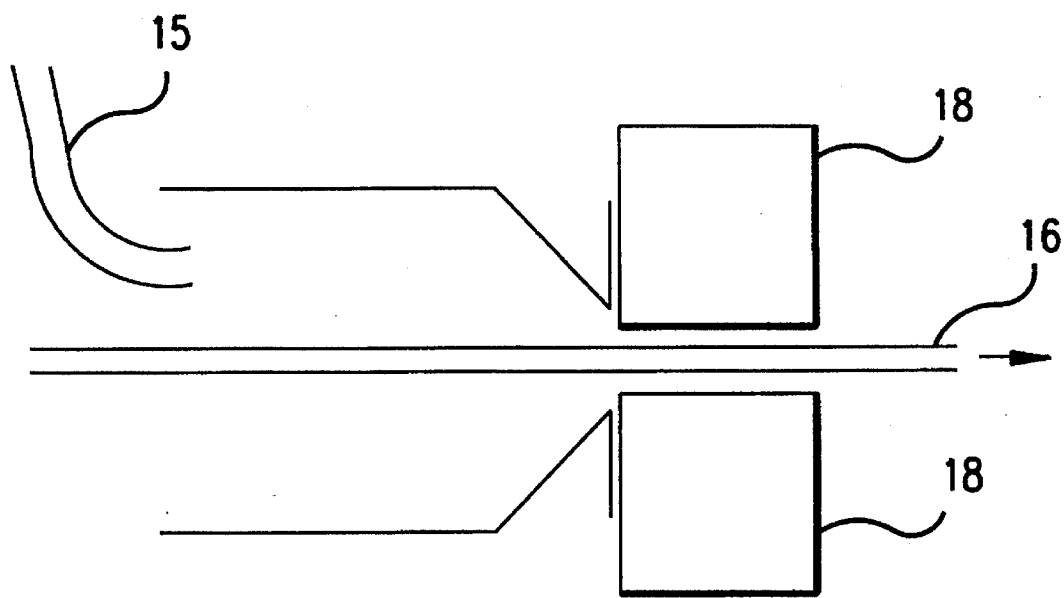
FIG. 3 is a schematic view of another application device for the coating agent.

Using the application device, the lacquer is applied centrally to the wire in a precisely defined amount. Nozzle or felt wipers which correspond to the prior art may, for instance, be used as an application device (examples of which are shown in FIGS. 2 and 3. Application devices are represented in FIGS. 2 and 3 as they could be used according to the invention. In FIGS. 2 and 3, 15 represents the capillary tube, 16 the wire to be coated, 17 a nozzle wiper and 18 a squeezed felt pad.). When using a squeezed felt pad, a conical funnel is expediently fitted in front of the feeding hole through the felt wiper to take up the amount of lacquer being supplied.

As a rule, several application devices are used in order to apply the insulating lacquer in several layers until the desired accretion of lacquer is achieved. Each layer of lacquer is hardened in a drying furnace at a temperature of ca. 250° to 500° C. before the next application. The degree of stoving is controlled by the rate of withdrawal and the furnace temperature.

During each application of lacquer, the thickness of the layer is set, for example, by a nozzle wiper (FIG. 2) or a squeezed felt pad (FIG. 3). The lacquer is preferably transported via capillary tubes directly into a funnel-shaped opening in the application device and in such an amount that it corresponds precisely to consumption, so that the funnel is always full, but not overflowing. The lacquer may also be trickled directly onto the wire in front of the application device and is then carried forward from there.

The use of several mixing devices and thus a different mixing ratio or a different composition for components A, B and C also enables the production of multi-layer structures with a wide spectrum of properties.

The lacquer layer is normally preferably produced by the continuous application and hardening of 3 to 20 individual layers. The individual layers could thus consist of different systems of substances and could sometimes be applied in a conventional manner in an individual process or in a tandem process.

For example, a layer of lacquer produced on an electrical conductor using a multi-component technique according to the invention may be provided with a covering made of nylon in the conventional way. It is also possible, for example, to apply a coating which contains a lubricant as the outermost layer using a multi-component technique.

The invention also relates to a new application or coating device for applying multi-component coatings to wires or wire-shaped structures, such as fibres. An application device of this kind is suitable for applying multi-component coatings which are mixed in a mixing device immediately before the application device. The new application device is therefore particularly suitable for performing the process according to the invention.

In the application device according to the invention the lacquer which is supplied from a mixing device (number 13 in the example in FIG. 1) passes initially into a storage container (vat or tank). The depth in this container is monitored and kept at an approximately constant level. Monitoring takes place using, for example, optical or acoustical methods. Holding the depth at an approximately constant level is achieved in particular by regulating the supply of individual components to the mixing device and/or by regulating the supply from the mixing device to the storage container. This regulation may be effected for example by electrical signals which act on points for supplying the individual components to the mixing device. In the embodiment represented by the example in FIG. 1, the pumps 10, 11 and 12 could be actuated in this way. The lacquer is then supplied to the wire or fibrous structure to be coated in any way, for example through capillary-like piping or bored holes. The wire may run horizontally or vertically, the supply being adapted to the particular case. According to a preferred embodiment, excess lacquer may flow back off the wire into the storage container. The amount in the storage container is kept as small as possible and is adapted to the amount actually consumed. In practice, the amount present in the storage container is of the order of magnitude of a few milliliters, for example 1 to 100 milliliters.

The invention also relates to a device for the preparation of coatings made from multi-component coating agents on wires or fiber-like materials with a storage container for the multi-component coating agent and devices for contacting the wire or fiber-like material with the multi-component coating agent from the storage container, with a supply piping for the multi-component coating which directly connects the storage container with a device for mixing the multi-component coating agent from its individual components, wherein the storage container is of such a size that during continuous coating the residence time of the multi-component coating agent is so brief that its hardening in the storage container is avoided and wherein the storage container possesses devices for regulating the amount of multi-component coating agent supplied from the mixing device and/or for supplying the individual components of the multi-component coating agent to the mixing device as a function of the depth in the storage container.

According to a preferred embodiment, after application of the multi-component coating agent by the application device according to the invention, the wire or fiber is transported through a wiping device which is preferably designed in the shape of a funnel, wherein the wire or the fiber is introduced via the wide opening of the funnel. The wiper is designed so that the wire is drawn horizontally through the wiping device. The wire is supplied with coating agent from below, from the side or from above through a narrow bored hole or capillary before the wiping device. Excess lacquer flows out of the wiping device, in particular out of the funnel-shaped cavity into a storage container located below the wiping device. This storage container is fed with fresh coating agent (this may for example be supplied from a mixing device for multi-component systems). The lacquer is introduced to the narrow bored hole or capillary from the storage container by means of a pump.

An example of a preferred embodiment of the device according to the invention is shown in FIG. 4. In FIG. 4, homogenised lacquer is pumped out of a mixing device 13 into a storage container 19. The amount of lacquer found therein is kept small and at approximately the same level by controlling the lacquer inflow. Using a pump 20, the lacquer is supplied to the wire to be coated (or to the fiber to be coated) 22 via a narrow bored hole or capillary 21 and is transported from here to the wiping device 23. There the excess lacquer is wiped off and flows back into the storage container 19. The base of the storage container 19 is preferably sloped so that the lacquer flows towards the supply piping for the pump 20.

The device according to the invention is provided with narrow cross-section piping which produces high rates of flow. This keeps the residence times short. In order to produce the lacquer film in several individual layers, many capillaries or bored holes could be appropriately arranged alongside each other.

The turbulent flow produced by narrow cross-sections, in combination with the short residence times, also hinders separating of lacquer components which are only slightly or not at all compatible. This greatly widens the possible selection of raw materials, because when formulating the lacquer, good storage stability does not have to be considered.

Using the process according to the invention and the device according to the invention it is possible to provide wires and fiber-like materials such as various fibres, e.g. glass fibres, carbon fibres, plastic fibres, with uniform coatings in a simple way, wherein the separation of undesired side products and the emission of solvents may be excluded or at least kept very low. Electrically conductive wires may be provided with insulating layers according to the invention. Other wires or fibres, such as glass fibres, may be coated for example for protection against mechanical damage, for protection against corrosion or for protection against hydrolysis.

The invention is explained further by using the following examples. Parts and percentage data refer to weight, provided nothing else is stated.

The following example describes the preparation of an aromatic/aliphatic polyamide and its application as a fired lacquer.

EXAMPLE 1

Component A 488 g of N-methylpyrrolidone, 209 g of xylene, 173 g of decanedioic acid, 51 g of sebacic acid and 90 g of terephthalic acid are heated to 60° C. with stirring in a 2 l three-necked flask which is fitted with a stirrer, a heating device, a reflux condenser and a nitrogen inlet. Then 170 g of an 80:20 mixture of 2,4- and 2,6-toluylene diisocyanate and 100 g of 4,4'-diisocyanatodiphenylmethane are added. The reaction mixture is now heated to 100° C. and stirred for 2 hours. It is then stirred for 10 hours at 130° C. and for 3 hours at 150° C. The peaks at about 2260 cm$^{-1}$ in the IR spectrum which are typical of isocyanate are no longer present.

The solids content of the solution is 41.5% (2 hours at 180° C.) and the viscosity is 1600 mPa.s/25° C. The solution is stable under storage for >8 months.

Component B

A commercial, liquid mixture of 4,4'- and 2,4'-diisocyanatodipiphenyl-methane (Basonat ADS 3374®; BASF) is used as the polyisocyanate component B.

Both components are passed separately and continuously to a mixing block with a static mixing tube via electronically controlled precision metering gear pumps. The mixing ratio (parts by weight) is 32:1; the viscosity of the mixture is 1550 mPa.s.

Further transportation to the wiper nozzles takes place via 4 capillary tubes, each 40 cm long and with an internal diameter of 0.05 cm. The rate of supply of the lacquer mixture is controlled by the rotational speed of the pump in such a way that there are no drainage losses.

The lacquer is applied to a copper wire of 0.315 mm diameter, which has been pre-coated with a commercial THEIC esterimide wire lacquer and has an overall diameter of 0.350 mm, using nozzles in 4 feed channels, and hardened in a 2.4 m long horizontal furnace at a circulating air temperature of 420° C. The results are given in Table 1.

In another test, the mixing ratio of components A and B was regulated to be 26.7:1. The test results are also given in Table 1.

Comparison example A

In this comparison example an aromatic/aliphatic polyamide as described in U.S. Pat. No. 4 501 883 (example 2) is prepared. 608 g of N-methylpyrrolidone, 151 g of an 80:20 mixture of 2,4- and 2,6-toluylene diisocyanate and 93 g of 4,4'- diisocyanato-diphenylmethane and then 185 g decanedioic acid and 72 g of terephthalic acid are placed with stirring at room temperature in a 2 l 3-necked flask fitted with a stirrer, heating device, reflux condenser and nitrogen inlet. This is then heated slowly to 75° C. and subsequently heated up to 175° C. over 4 hours. Stirring is continued for another 4 hours at 170°–175° C. The solution has a solids content of 40.3% (one hour 180° C.); it had thickened after one month.

Some of the solution was diluted to 29.1% (1 hour 180° C.) with N-methylpyrrolidone, the viscosity then being 1200 mPa.s. The solution is stable under storage for 3 to 4 months.

The diluted solution was applied and hardened in a conventional method of application using nozzles in 4 feed channels as in example 1, onto a copper wire with a diameter of 0,315 mm, which was pre-coated with a commercial THEIC esterimide wire lacquer and had an overall diameter of 0.350 mm. The test values are given in Table 1. The tests on the lacquered wire were performed as in DIN 46453 Part 1.

TABLE 1

|  | Comparison test A | Example 1 | | | | | | |
|---|---|---|---|---|---|---|---|---|
| Mixing ratio A:B (parts by weight) | — | 32:1 | | | 26.7:1 | | | |
| Solids content | 29.1 | 41.5 | | | 41.6 | | | |
| Viscosity (25° C.) mPa · s | 1200 | 1550 | | | 1590 | | | |
| Viscosity after 5 hours mPa · s |  | 1820 | | | 1860 | | | |
| Speed m/min | 50 | 40 | 50 | 60 | 40 | 50 | 60 | |
| Surface (Wire test results) | OK | OK | OK | OK | OK | OK | OK | |
| Tests on enamelled wire Increase in diameter μm | 20 | 18 | 18 | 18 | 18 | 18 | 18 | |
| Cut-through temperature °C. measured as in DIN 46453 part 1 | 354 | 355 | 362 | 358 | 356 | 358 | 366 | |
| Flow time and temperature 60 min., 210° C. Bonding strength | 1.8 | 1.6 | | | 1.8 | | | |
| Resoftening temperature °C. | 275 | 270 | | | 280 | | | |

EXAMPLE 2

Polyamide selfbonding enamel

Example 2 also describes the preparation of an aromatic-aliphatic polyamide and its use as a selfbonding enamel.

Component A

A 2l three-necked flask fitted with a stirrer, heating device, reflux condenser and nitrogen inlet, was used.

768 g N-methylpyrrolidone, 329 g xylene, 333 g decanedicarboxylic acid, 71 g adipic acid, 85 g terephthalic acid, 309 g of a 80/20 mix of 2.4- and 2.6-toluylene diisocyanate, 111 g 2,4'/4,4'-diisocyanatodiphenylmethane (Basonate ADS$^R$, BASF)

were reacted as in Example 1. The solution had a solids content of 40.6% (2 hours at 180° C.) and a viscosity of 2310 mPa.s.

Component B

A commercial 67% solution of the reaction product of trimethylol propane and toluylene diisocyanate having an NCO content of 11.5% (Desmodur L/67 NX$^R$ BAYER) was used as polyisocyanate component B As in Example 1, both components were applied in four steps on a precoated copper and hardened. The test results are given in the following Table 2.

TABLE 2

| Mixing ratio A:B (Part by weight) | 8.27:1 | | | 5.51:1 | | | 4.13:1 | | |
|---|---|---|---|---|---|---|---|---|---|
| Solids content % | 42.7 | | | 43.9 | | | 44.8 | | |
| Speed m/min. | 40 | 50 | 60 | 40 | 50 | 60 | 40 | 50 | 60 |
| Surface Wire test results | OK | OK | OK | OK | OK | OK | OK | OK | OK |
| Tests on enamelled wire measured as in DIN 46 453 Part 1 Cut-through temperature measured °C. | 357 | 355 | 359 | 353 | 353 | 356 | 355 | 361 | 357 |
| Flexibility and adherence Mandrel test % | 30 | 10 | 0 | 30 | 30 | 15 | 30 | 30 | 30 |
| Flow time and temperature 60 min, 210° C. Bonding strength N | 2.4 | 2.6 | 2.6 | 1.9 | 2.2 | 2.5 | 1.8 | 2.0 | 2.3 |
| Resoftening temperature °C. | 281 | 219 | 273 | 271 | 258 | 265 | 268 | 259 | 256 |

EXAMPLE 3

This example describes the preparation of a polyamide-imide coating.

Component A 650 g N-methylpyrrolidone, 160 g xylene, 398 g trimellitic acid anhydride, 267 g 4,4' diisocyanatodiphenylmethane and 124 g of an 80/20 mixture of 2.4- and 2.6-toluylene diisocyanate are filled into a 2l three-necked flask, fitted with stirrer, heating device, reflux condenser and nitrogen inlet. The content is stirred and within one hour heated to 90° C. and then, using a speed of 10° C. per hour, to 150° C. The content is stirred for a further hour at 150°

C. The absorption peaks at about 2260 cm⁻¹ in the IR spectrum which are typical for isocyanate are no longer present.

The solids content of the solution is 54.0 % (2 hours at 180° C.). The solution is added with 410 g of a 70/30 mixture of N-methylpyrrolidone and xylene in order to obtain a solids content of 42 % and a viscosity of 1700 mPa.s.

Component B

A commercial liquid mixture of Basonate ADS 3374$^R$ (BASF) and Desmodur L/67 MX$^R$ (BAYER) (weight ratio 1:1) is used as polyisocyanate component B.

Both components are passed separately and continuously to a mixing block with a static mixing tube. The mixing ratio (parts by weight) is 10.4:1; the viscosity of the mixture immediately after the preparation is 1840 mPa.s at a solids content of 45.7 % (2 hours at 180° C.).

The lacquer is applied to a copper wire having a diameter of 0.30 mm using an application device as shown in FIG. 4, having nozzles in 8 feed channels. Then it is hardened in a 2.4 m long horizontal furnace at a circulating air temperature of 500° C. The results are given in Table 3.

1040.0 g N-methylpyrrolidone, 230.0 g decanedicarboxylic acid, 48.7 g adipic acid, 119.2 g terephthalic acid, 50.1 g benzoic acid, 274.8 g of an 80/20 mixture of 2.4- and 2.6 toluylene diisocyanate 169.2 g 4.4' diisocyanatodiphenylmethane.

The solution has a viscosity of 4590 mPa.s/25° C. and an acid value of 3 mg KOH/g. The solution is diluted with 200 g xylene to a solids content of 37.2% (2 hours at 180° C.), having a viscosity of 1530 mPa.s/25° C.

Component B

As in Example 2, Desmodur L/67 MX$^R$ (BAYER) is used as the polyisocyanate component B.

As in Example 1, both components are applied to a precoated copper wire in 4 steps. Afterwards they are hardened. The results are given in Table 4.

TABLE 4

| Mixing ratio Part by weight (A:B) | 11.1:1 | | | 7.4:1 | | | 5.5:1 | | |
|---|---|---|---|---|---|---|---|---|---|
| Solids content (1 h 180° C.) % | 39.4 | | | 40.5 | | | 41.6 | | |
| Speed m/min | 30 | 40 | 50 | 30 | 40 | 50 | 30 | 40 | 50 |
| Surface | OK | OK | OK | OK | OK | OK | OK | OK | OK |
| Wire test results according to DIN 46 453 Part I | | | | | | | | | |
| Softening temperature °C. | 349 | 334 | 330 | 345 | 347 | 351 | 355 | 342 | 349 |
| Flexibility and adherence Mandrel test % | 25 | 15 | 0 | 30 | 20 | 0 | 30 | 30 | 10 |
| Flow time and temperature 60 min. 210° C. | | | | | | | | | |
| Bonding strength N | 2.1 | 1.6 | 1.2 | 1.9 | 2.1 | 1.9 | 2.0 | 2.0 | 2.0 |
| Resoftening temperature °C. | 283 | 259 | 222 | 251 | 245 | 226 | 237 | 231 | 225 |

TABLE 3

| Speed m/min | 35 | 40 | 45 |
|---|---|---|---|
| Surface | OK | OK | OK |
| Test on enamelled wire (DIN 46 453) | | | |
| Increase in diameter μm | 33 | 33 | 33 |
| Flexibility and adherence Mandrel test % | 25 | 30 | 30 |
| Heat shock | OK | OK | OK |
| Softening temperature °C. | >440 | >440 | >435 |
| tan-δ intersection point °C. | 254 | 253 | 252 |

EXAMPLE 4

Example 4 describes the preparation and use of an aromatic-aliphatic polyamide, the end groups of which are furnished by benzoic acid groups instead of carboxylic groups. The cross-linking is achieved via amide groups.

Component A

A 2l three-necked flask fitted with stirrer, heating device and reflux condenser and nitrogen inlet is used. As in Example 1 the following ingredients are reacted:

What is claimed, is:

1. A process for the preparation of coatings on wires or fibers by coating with liquid mixtures of polymers and polyisocyanates and then hardening, comprising forming a multi-component coating agent by mixing:

A) one or more polymers having at least two groups independently selected from carboxyl groups and amide groups, a hydroxyl number of less than 130 and a number average molecular weight of 200 to 5000, in the liquid state, and B) one or more polyisocyanates having at least two free isocyanate groups in the molecule and a number average molecular weight of 200 to 3000, in the liquid state, continuously and immediately before application to the wire or fiber in a ratio such that 0.5 to 5.0 isocyanate groups are allotted to each carboxyl group or that 0.02 to 2.0 isocyanate groups are allotted to each amide group, wherein at least one of the components A, B may contain one or more catalysts, and transporting said multi-component coating agent continuously to each separate wire or fiber which is in continuous motion in an amount needed for coating each said separate wire or fiber, and applying said agent onto said wires or fibers to produce a coating.

2. A process according to claim 1, wherein each said wire is an electrically conductive wire and said process comprises forming an insulating coating on each said electrically conductive wire.

3. A process according to claim 1, wherein each fiber is a glass fiber.

4. A process according to claim 1 further comprising producing one or more of components A, B in a liquid state by using a process selected from the group consisting of using solvent-free liquid polymers and solvent-free liquid polyisocyanates, adding solvent to achieve a coating viscosity and by warming.

5. A process according to claim 1, further comprising supplying the mixture to each separate wire or each separate fiber through a separate capillary tube or through a bored hole having capillary properties.

6. A process according to claim 1, wherein the multi-component coating agent further comprises a lubricant.

7. A process according to one of claims 1–6, which is carried out using a device comprising a storage container for the multi-component coating agent and apparatus for contacting the wire or fiber with the multi-component coating agent from the storage container, supply piping for the multi-component coating agent which connects the storage container directly with a device for mixing the multi-component coating agent from its individual components, wherein the storage container is sized so that with continuous coating, a residence time of the multi-component coating agent in the storage container is sufficiently short that hardening thereof in the storage container is avoided, and wherein the storage container includes devices for regulating the amount of multi-component coating agent fed from the mixing device and for supplying the individual components in the multi-component coating agent to the mixing device, as a function of depth thereof in the storage container.

8. A process according to claim 7, wherein the device comprises one or more capillaries or bored holes (21) as application devices, each having a wiper (23) for the multi-component coating agent on horizontal feeding of a wire or fiber wherein the storage container (19) is sited below the wiper (23) and comprises piping for withdrawing the multi-component coating agent from the storage container (19) by means of a pump (20) for feeding the capillaries or bored holes (21) which lead to the wire or fiber to be coated.

* * * * *